United States Patent [19]
Thiele

[11] 3,828,772

[45] *Aug. 13, 1974

[54] METHOD OF FUSING BONES

[76] Inventor: Geraldine H. Thiele, Rt. 1, Box 12, Windber, Pa. 15963

[ * ] Notice: The portion of the term of this patent subsequent to June 26, 1990, has been disclaimed.

[22] Filed: Aug. 25, 1972

[21] Appl. No.: 283,663

[52] U.S. Cl............................... 128/92 G, 424/318
[51] Int. Cl. .............................................. A61f 5/00
[58] Field of Search.... 128/92 R, 92 G, 215, 334 R; 424/318

[56] References Cited
UNITED STATES PATENTS

| | | | |
|---|---|---|---|
| 3,030,951 | 4/1962 | Mandarino | 128/92 G |
| 3,223,083 | 12/1965 | Cobey | 128/92 R |
| 3,741,204 | 6/1973 | Thiele | 128/92 G |

*Primary Examiner*—Dalton L. Truluck
*Attorney, Agent, or Firm*—Christen & Sabol

[57] ABSTRACT

Bones can be fused together by injecting a liquefied composition containing a non-necrotic vascular sclerosing agent into the interface region between the bones. Normally a cast or brace is not used. The preferred non-necrotic vascular sclerosing agent is sodium oleate. Splints and diffused splints can be prepared using the bone fusing technique.

17 Claims, 1 Drawing Figure

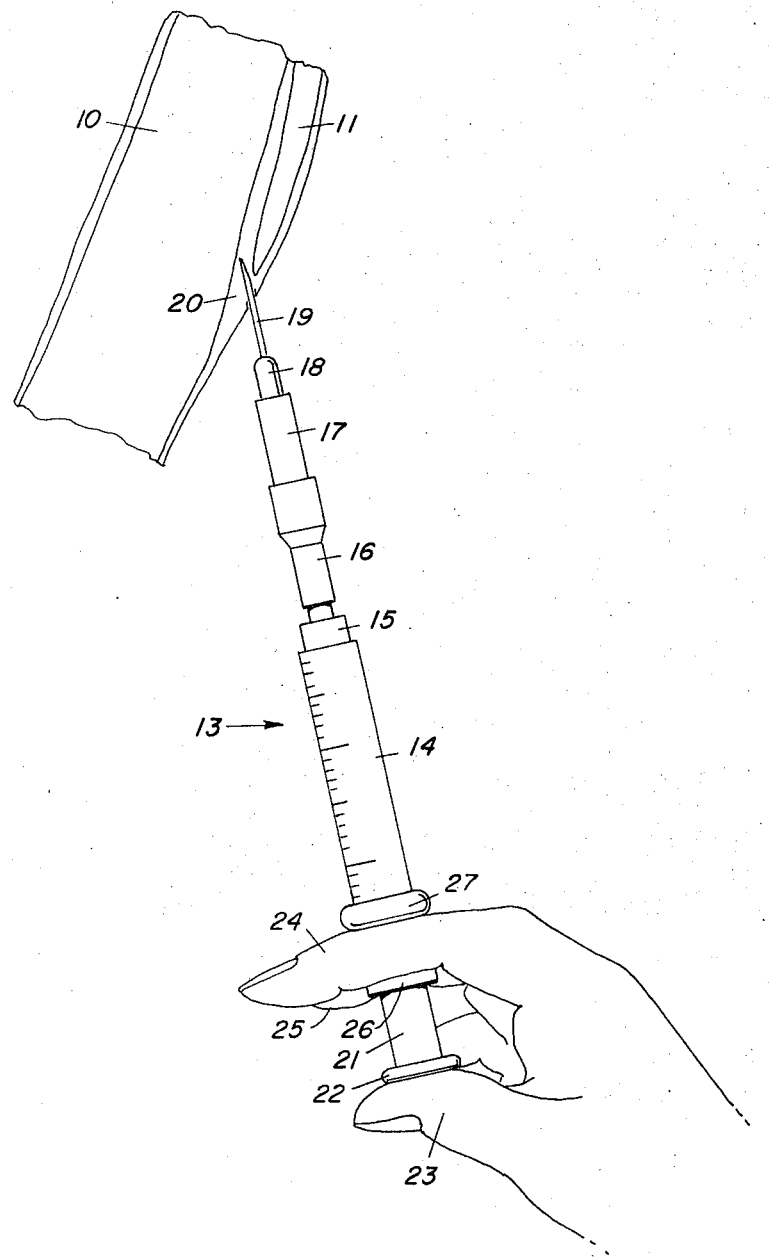

METHOD OF FUSING BONES

This application is a continuation-in-part of copending U.S. Pat. application No. 113,362 filed on Feb. 8, 1971, now U.S. Pat. No. 3,741,204, and is a continuation-in-part of copending U.S. Pat. application No. 123,830, filed on Mar. 12, 1972.

BACKGROUND OF THIS INVENTION

1. Field of this Invention

This invention relates to the fusion of bones using a non-necrotic vascular sclerosing agent.

2. Prior Art

Known vascular sclerosing agents include phenol, zinc, sulphate, glucose, strong sodium chloride solution, tannic acid and extracts containing tannins, urea, quinine, resins and extracts containing them, mineral acids, the salts or soaps of the fatty acids of various oils, particularly cod liver oil, and psyllium seed oil, amine soaps of fatty acids, ethanol, dextrose and invert sugar.

U.S. Pat. No. 1,621,118 teaches producing serum by treating bacteria and/or their toxins with soluble salts of higher fatty acids, and injecting the resultant antigens into the system of man and animal. U.S. Pat. No. 1,936,456 discloses the use of sodium ricinoleate and a fluid vehicle to treat internal body surfaces which can only be reached through body orifices.

BROAD DESCRIPTION OF THE INVENTION

This invention involves a process of fusing the bones of man and animal. The process includes: aligning (only when necessary) the bones to position, so that the interfaces of the bones are in juxtaposition, for fusing; and then injecting at least one dosage of a liquefied composition comprised of a non-necrotic vascular sclerosing agent and a liquid carrier into the interface region between the bones. The injection is repeated, if necessary, until there is a substantially complete fusion of the bones. Preferably another dosage is injected a week or two after the first dosage and then every week or two thereafter, as needed, until there is a substantially complete fusion of the bones.

The non-necrotic vascular sclerosing agent can be, among other things, a fatty acid compound, e.g., a fatty acid salt or a fatty acid soap. The preferred non-necrotic vascular sclerosing agent is sodium oleate. The preferred liquid carrier is water.

The preferred composition is comprised of 5 percent of sodium oleate, 1.5 percent of ethyl alcohol, enough disodium hydrogen phosphate to adjust the pH to 9.8, and the remainder water.

The process of this invention can be used to fuse bones to prevent the occurrence of trauma of bones and possible fracture, break or non-union of such bones. For example, the process of this invention can be used in the fusion of the meta-carpals and/or meta-tarsals in regards to the three bone weight bearing complex in horses. More specifically, the medial and lateral meta-carpal and/or meta-tarsal is fused to the main shaft of the leg in horses, particularly in race horses which suffer a great deal of trauma in the affected region. The process of this invention can also be used to fuse bones together whenever needed for medical reasons, for example, when vertebra in the spinal column need to be fused together. Broadly, the process of this invention can be used to fuse any boney materials, such as, tendons and bone cartilages.

The fusion usually is completed in 8 to 10 weeks, sometimes less.

A cast or brace should not normally be used around the bone areas to be fused. A cast leads to compression and atrophy of muscle, which of course is undesirable. In the case of equine, the use of a cast in the case of certain bones is impossible. The injection of a non-necrotic vascular sclerosing agent at the interface region of the bones to be fused quickly chemically introduces "struts," which aligns and fixes the bones in relationship to each other which means braces and casts usually do not have to be used. The lack of the cast not only eliminates atrophy of muscles.

Bone is almost incompressible under normal loads. Trauma to the bone results from excessive loads to the bone, which is compressed during those periods, for example, in the legs of show and race horses. Fusion of certain bones in the legs of show and race horses prevents the occurence of such trauma and helps prevent leg fractures, breaks and non-unions.

When a non-necrotic vascular sclerosing agent is injected into the interface region between bones a non-vascular environment, which is controlled by an electrical field, the appropriate ionic concentration charges the area and the fantastic selectivity of the osteogenic cells can, therefore, put down cartilage. (In a non-vascular environment bone is formed.) Struts of callus are laid down between the bone surfaces. Callus is comprised almost entirely of cartilage, and nature converts it into bone so that a permanent union can be established.

The process of this invention can also be used to fuse pieces of bone to other bones in order to form a splint in order to strengthen or protect the other bone from excessive force, pressure, compressive trauma, etc. The bones to which such splints are applied can be those which have been weakened for some reason or which nature has not made strong enough for the task to which man or animal has put it. A splint can also be applied to prevent movement of a joint (as it would involve fusing a piece of bone to two or more other bones). This invention can also be used to prepare diffused splints.

This invention can be used to treat man and/or animal. This invention is particularly useful in the treatment of racing and troting horses; but can be used to treat, for example, all equine, e.g., horses and mules, donkeys, sheep, goats, swine bovines, e.g., oxen and cows, dogs, cats, etc.

DETAILED DESCRIPTION OF THIS INVENTION

In the FIGURE, the main bone is illustrated at 10, the minor bone is illustrated at 11, and the interface region of bones 10 and 11 is illustrated at 12. A syringe entity is indicated at 13 and includes graduated cylinder 14, which cylinder converges toward one end and is in communication with a polyvinyl tube 15 through sleeve 16. Tube 15, in turn, is in communication with nylon adapter 17, the latter emptying into a hypodermic needle socket 18, the needle being indicated at 19. The point of needle 19 is inserted through flesh 20 and inserted into interface region 12, as illustrated. cylinder 14 is adapted for the reception of a fluid composition containing a non-necrotic vascular sclerosing agent. The fluid composition is forced from cylinder 14 by plunger 21, which has finger-engaging head 22. The heads are operated by thumb 23 of the user. Two of the fingers of the user, 24 and 25, are interposed between terminal flange 26 of cylinder 14 and clamp 27 as shown in the FIGURE.

Each dosage usually contains between 0.1 and 10 c.c., depending on the size, etc. of the man or animal and the bones being fused. More particularily, the dosage usually contains between 0.2 and 5 c.c. When a horse is being treated, best results are obtained when the dosage is between 0.5 and 3 c.c.

The term liquefied composition includes slurries, suspensions, solutions, etc.

All of the components of the liquefied composition must be substantially non-toxic in the amounts and under the conditions of use.

The pH of the liquefied composition should be between about 8 and about 11, and preferably between 9 and about 10. Each non-necrotic vascular sclerosing agent will produce a different pH at different concentration levels so non-toxic agents may be added to adjust the pH level, e.g., disodium hydrogen phosphate can be used when sodium oleate is used.

Natural or synthetic fatty acids can be used to form the fatty acid compound. Mixtures of fatty acids can be used.

Useful fatty acids for forming the fatty acid compounds may be saturated or unsaturated. The useful saturated fatty acids are represented by the general formula: ROOCH, where R can be H, an alkyl group, branched or straight chain. Examples of useful saturated fatty acids are formic acid, acetic acid, propionic acid, n-butyric acid, isobutyric acid, N-valeric acid, n-caproic acid, n-heptoic acid, caprylic acid, n-nonylic acid, capric acid, undecylic acid, lauric acid, tridecylic acid, myristic acid, pentadecylic acid, palmitic acid, margaric acid, stearic acid, nonadecanoic acid, heneiscosanoic acid, triosanic acid, lignoceric acid, pentacosanoic acid, cerotic acid, arachidic acid and behenic acid. Examples of useful unsaturated fatty acids are oleic acid, linoleic acid, linolenic acid, licanic acid, eleostearic acid, ricinoleic acid, clupanodonic acid and palmitoleic acid. The useful unsaturated fatty acids can be those containing one double bond, e.g., oleic acid (preferred), two double bonds, e.g., linoleic acid, three double bonds, e.g., eleostearic acid, etc.

Useful fatty acids for forming the fatty acids salts which contain one or more hydroxyl groups are, e.g., dihydroxystearic acid. Useful hydrogenated fatty acids are cod liver oil fatty acids, tallow fat fatty acids, castor oil fatty acids, rape oil fatty acids, peanut oil fatty acids, cottonseed oil fatty acids, corn oil fatty acids, soybean oil fatty acids, linseed oil fatty acids, tung oil fatty acids, oiticia oil fatty acids, lard oil fatty acids, neat's foot oil fatty acids, whale oil fatty acids, olive oil fatty acids, coconut fat fatty acids, palm fat fatty acids, butter fat fatty acids, lard fat fatty acids and fish oil fatty acids. The useful hydrogenated fatty acids can be obtained from vegetable oils and fats, and animal oils and fats. Polymeric fatty acids can be used.

The fatty acid compound can be a fatty acid salt. The fatty acid salts can be those prepared from metals, such as, aluminum and alkaline earth metals, e.g., calcium, but are preferably those prepared by alkali metals, e.g., sodium (preferred), lithium, potassium, caesium and rubidium. (Ionic fatty acid compounds, such as, sodium oleate, are preferred, even though the potassium salts are usually more soluble.) The metals are used as compounds such as hydroxides, carbonates, etc. The fatty acid salts can be prepared from ammonia and similar non-metallic inorganic bases. The fatty acid compounds can be esterified fatty acids, e.g., methyl formate, ethyl propionate and n-amyl acetate. The fatty acid compounds can be soaps such as the reaction products of the fatty acids and organic bases, e.g., methylamine, triethanolamine, monoethanolamine, diethanolamine, phenyl ethanol amine, ephedrine and pseudoephedrine. Fatty acid soaps of mono -di- and tri-alkyl amines and aryl amines can be used.

U.S. Pat. No. 2,115,491 teaches a method of preparing the sodium salts or soaps of the fatty acids or psyllium seed oil. Amine soaps of the fatty acids can be prepared by the method taught by U.S. Pat. No. 2,090,456. U.S. Pat. No. 1,767,041 discloses a method of making the reaction product of alkali metals and fatty acids. The other fatty acid compounds can be made by methods readily known by those ordinarily skilled in the art.

The liquefied solutions should contain between about 0.5 and about 10 percent by weight of the fatty acid compound, and preferably contain between about 1 and about 5 percent by weight of the fatty acid compound.

Examples of specific useful compounds of fatty acid which can be used as non-necrotic vascular sclerosing agents are: sodium oleate (preferred); sodium psylliate (a mixture of the sodium salts of psyllium oil liquid fatty acids); sodium ricinoleate; ethylamine oleate; monoethanolamine oleate; sodium formate; sodium acetate; and calcium propionate. Salts of fatty acids are preferred, particularly those formed from alkali metals, and the preferred fatty acid salt is sodium oleate.

Examples of other useful non-necrotic sclerosing agents are dextrose and invert sugar. (Invert sugar is a mixture of dextrose and levulose obtained by the inversion of sucrose.) Solutions containing, for example, dextrose (25 wt. percent) and sodium chloride (15 wt. percent), or invert sugar (30 wt. percent) and sodium chloride (10 wt. percent) can be used. Solutions containing about 50 percent by weight of dextrose are preferred. Solutions containing about 60 to about 70 percent by weight of invert sugar are preferred.

The fatty acid compounds (preparations) are preferred over the other useful non-necrotic vascular sclerosing agents because, for among several reasons, less of the liquefied composition (dosage) is needed. This means that less of the less concentrated fatty acid compound preparations are needed than the more concentrated preparations such as those containing dextrose or invert sugar.

Solutions of dextrose or invert sugar or salts of fatty acids are not very difficult and do not product necrosis.

Examples of the liquid carrier for the non-necrotic vascular sclerosing agent are: water (preferred); monoglycerides; diglycerides; etc. Water is the preferred liquid carrier, and salt (NaCl) can be added to make an isotonic aqueous solution as the liquid carrier.

The useful vascular sclerosing agents must be non-necrotic in affect or operation. Sclerosing agents, to be useful, must not cause the pathologic death of one or more cells, or a portion of tissue or organ, resulting from irreversible damage to the nucleus.

Anodynes in amounts of up to and including about 5 percent by weight may be added. An anodyne is an agent which has the power to relieve pain. An example of a useful anodyne is benzyl alcohol. In general small amounts of antiseptics or anaesthetics can be used.

Suitable preservations can be added in an amount not to exceed 0.5 percent by weight.

In some instances it may be necessary to use a brace or traction, but a cast as such is not used.

Unless otherwise stated or indicated, in the following examples, all percentages and proportions are expressed on a weight basis.

The following examples further illustrate, but do not limit this invention.

EXAMPLE 1

A liquefied composition containing 5 weight percent of sodium oleate, 1.5 weight percent of ethanol, enough disodium hydrogen phosphate to obtain a pH of 9.8 and the remainder water. The liquefied composition was placed in several 2 c.c. ampoules. One of the ampoules was used to fill a hypodermic needle syringe of the type shown in the FIGURE. The liquefied solution was injected into the interface region between two bones in a leg of a horse to be fused. The treatment was not painful. X-rays indicated that "struts" were produced, giving rise to fixation and then complete fusion of the bones. The horse used the leg during the entire period of time. Another injection was made on the tenth day, and about every ten days thereafter until the surfaces of the bones were substantially fused after about 2 months.

EXAMPLE 2

Example 1 was repeated, except that the liquefied composition containing the non-necrotic vascular sclerosing agent of Example 1 was replaced with an aqueous solution (5 c.c. vial) containing 5 percent of sodium physlliate and 2 percent by weight of benzyl alcohol. That aqueous solution had a pH of 8.9 (enough 10 percent NaOH solution was added to achieve that level). The surfaces of the bones were substantially fused in about 2 months after repeated injections.

EXAMPLE 3

Example 1 was repeated, except that the liquefied composition containing the non-necrotic vascular sclerosing agent of Example 1 was replaced with an aqueous solution (2 c.c. vial) containing 5 percent of sodium pyslliate. A NaOH solution was added to obtain a pH level of 8.7. The surfaces of the bones were substantially fused in about 2 months after repeated injections.

EXAMPLE 4

Example 1 was repeated, except that the liquefied composition containing the non-necrotic vascular sclerosing agent of Example 1 was replaced with an aqueous solution (2 c.c. vial) containing 2 percent of sodium ricinoleate. That solution had a pH between 8.2 and 8.5. The surfaces of the bones were substantially fused in about 2 months after repeated injections.

EXAMPLE 5

Example 1 was repeated, except that the liquefied composition containing the non-necrotic vascular sclerosing agent of Example 1 was replaced with an aqueous solution (2 c.c.) containing 50 percent dextrose. The surfaces of the bones were substantially cured in about 2 months after repeated injections.

EXAMPLE 6

Example 1 was repeated, except that the liquefied composition containing the non-necrotic vascular sclerosing agent of Example 1 was replaced with an aqueous solution (2 c.c. ampul) containing 65 percent of invert sugar. The surfaces of the bones were substantially fused in about 2 months after repeated injections.

EXAMPLE 7

Example 1 was repeated, except that the liquefied composition containing the non-necrotic vascular sclerosing agent of Example 1 was replaced with an aqueous solution (2 c.c. ampul) containing 5 percent ethylamine oleate and 2 percent benzyl alcohol. The surfaces of the bones were substantially fused in about 2 months after repeated injections.

EXAMPLE 8

Example 1 was repeated, except that the liquefied composition containing the non-necrotic vascular sclerosing agent of Example 1 was replaced with an aqueous solution (2 c.c. ampul) containing 5 percent ethylamine oleate. The surfaces of the bones were substantially fused in about 2 months after repeated injections.

EXAMPLE 9

Example 1 was repeated, except that the liquefied composition containing the non-necrotic vascular sclerosing agent of Example 1 was replaced with an aqueous solution (2 c.c. ampoule) of 1 percent of sodium oleate and enough NaOH to bring the pH up to 9.1. The surfaces of the bones were substantially fused in about 2 months after repeated injections.

EXAMPLE 10

Example 1 was repeated, except that the liquefied composition containing the non-necrotic vascular sclerosing agent of Example 1 was replaced with an aqueous solution (2 c.c. ampoule) of a 3 percent solution of sodium oleate and enough KOH to bring the pH up to 9.3. The surfaces of the bones were substantially fused in about 2 months after repeated injections.

EXAMPLE 11

Using the same injection technique and liquefied composition of Example 1, a piece of bone was fused on both ends to another bone, thereby creating a splint.

What is claimed is:

1. A process of fusing bones, having surfaces in juxtaposition, which comprises injecting at least one dosage in an effective amount of a liquefied composition comprised of a non-necrotic, fatty acid compound, vascular sclerosing agent and a liquid carrier into the interface region of said bones, said process being repeated, when necessary, until there is substantially complete fusion of said surfaces of said bones which are in juxtaposition in said interface region.

2. A process as described in claim 1 wherein said non-necrotic vascular sclerosing agent is sodium oleate.

3. A process as described in claim 1 wherein said liquefied composition is composed of about 5 percent of sodium oleate, about 1.5 percent of ethyl alcohol, enough disodium hydrogen phosphate to obtain a pH of about 9.8 and water.

4. A process as described in claim 1 wherein said fatty acid compound is a fatty acid salt.

5. A process as described in claim 1 wherein said fatty acid compound is a salt of an alkali metal or basic alkali metal compound and a fatty acid.

6. A process as described in claim 1 wherein said liquid carrier is water.

7. A process as described in claim 1 wherein a dosage of said liquefied composition is injected into said interface region of said bones every week or two until there is a substantially complete fusion of said surfaces of said bones which are in juxaposition in said interface region.

8. A process as described in claim 1 wherein a piece of bone is fused on each end to another bone thereby creating a splint.

9. A process as described in claim 5 wherein said alkali metal is sodium.

10. A process as described in claim 5 wherein said fatty acid is oleic acid.

11. A process as described in claim 5 wherein said alkali metal is sodium, wherein said fatty acid is oleic acid, wherein said liquefied carrier is water, wherein said liquefied composition has a pH between 9 and 10, and wherein said fatty acid compound is present in an amount between about 1 and about 5 percent.

12. A process as described in claim 5 wherein said fatty acid is an unsaturated fatty acid.

13. A process as described in claim 11 wherein said liquefied composition also contains ethanol.

14. A process as described in claim 11 wherein said dosage contains 0.1 to 10 c.c. of said liquefied composition.

15. A process as described in claim 5 wherein said liquefied composition has a pH between 8 and 11.

16. A process as described in claim 5 wherein said fatty acid compound is present in an amount between about 0.5 and 10 percent.

17. A process as described in claim 1 wherein said dosage contains 0.1 to 10 c.c. of said liquefied composition.

* * * * *